United States Patent
Park

(10) Patent No.: US 11,240,834 B2
(45) Date of Patent: *Feb. 1, 2022

(54) METHOD FOR SIMULTANEOUS TRANSMISSION OF CONTROL SIGNALS, TERMINAL THEREFOR, METHOD FOR RECEIVING CONTROL SIGNAL, AND BASE STATION THEREFOR

(71) Applicant: SOLID, INC., Seongnam-si (KR)

(72) Inventor: Dong Hyun Park, Seoul (KR)

(73) Assignee: SOLID, INC., Seongnam-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/811,462

(22) Filed: Mar. 6, 2020

(65) Prior Publication Data

US 2020/0214030 A1 Jul. 2, 2020

Related U.S. Application Data

(63) Continuation of application No. 16/145,091, filed on Sep. 27, 2018, now abandoned, which is a
(Continued)

(30) Foreign Application Priority Data

Jun. 21, 2012 (KR) .................. 10-2012-0066705

(51) Int. Cl.
| | | |
|---|---|---|
| *H04W 72/12* | (2009.01) | |
| *H04L 5/00* | (2006.01) | |
| *H04L 1/18* | (2006.01) | |
| *H04L 1/16* | (2006.01) | |
| *H04W 72/04* | (2009.01) | |

(Continued)

(52) U.S. Cl.
CPC .......... *H04W 72/1284* (2013.01); *H04L 1/16* (2013.01); *H04L 1/1671* (2013.01); *H04L 1/1854* (2013.01); *H04L 1/1861* (2013.01); *H04L 5/001* (2013.01); *H04L 5/0053* (2013.01); *H04L 5/0055* (2013.01); *H04L 5/0094* (2013.01);
(Continued)

(58) Field of Classification Search
CPC ......... H04W 72/1284; H04W 72/0406; H04W 88/08; H04L 1/1854; H04L 5/001; H04L 5/0055; H04L 5/0053; H04L 5/0094; H04L 27/26; H04L 1/16
USPC ......................................... 370/329, 336, 280
See application file for complete search history.

(56) References Cited

U.S. PATENT DOCUMENTS

| | | |
|---|---|---|
| 7,852,883 B2 | 12/2010 | Kwak et al. |
| 2009/0219897 A1 | 9/2009 | Pajukoski et al. |

(Continued)

FOREIGN PATENT DOCUMENTS

| | | |
|---|---|---|
| KR | 10-2011-0027591 | 3/2011 |
| WO | 2010-105680 | 9/2010 |

OTHER PUBLICATIONS

International Search Report dated Oct. 11, 2013, in International Application No. PCT/KR2013/005473.
(Continued)

*Primary Examiner* — Kwang B Yao
*Assistant Examiner* — Syed M Bokhari
(74) *Attorney, Agent, or Firm* — H.C. Park & Associates, PLC

(57) ABSTRACT

The present invention relates to a method and an apparatus allowing a simultaneous transmission of control signals in a wireless communication system.

10 Claims, 9 Drawing Sheets

Related U.S. Application Data continuation of application No. 14/410,553, filed as application No. PCT/KR2013/005473 on Jun. 21, 2013, now Pat. No. 10,098,141.

(51) Int. Cl.
*H04W 72/00* (2009.01)
*H04W 88/08* (2009.01)

(52) U.S. Cl.
CPC ........ *H04W 72/0406* (2013.01); *H04W 72/00* (2013.01); *H04W 88/08* (2013.01)

(56) References Cited

U.S. PATENT DOCUMENTS

| | | |
|---|---|---|
| 2010/0046460 A1 | 2/2010 | Kwak et al. |
| 2010/0195629 A1* | 8/2010 | Chen ................ H04L 1/1861 370/336 |
| 2011/0134968 A1* | 6/2011 | Han .................... H04L 5/0023 375/146 |
| 2011/0211546 A1 | 9/2011 | Hooli et al. |
| 2011/0228877 A1 | 9/2011 | Han et al. |
| 2012/0155337 A1* | 6/2012 | Park ................ H04W 72/0413 370/280 |
| 2012/0155413 A1 | 6/2012 | Liu et al. |
| 2012/0170533 A1 | 7/2012 | Ahn et al. |
| 2013/0230030 A1 | 9/2013 | Papasakellariou et al. |
| 2013/0272258 A1 | 10/2013 | Lee et al. |
| 2015/0023305 A1* | 1/2015 | Yin ..................... H04L 1/003 370/329 |
| 2015/0312013 A1* | 10/2015 | Xu ..................... H04L 5/0053 370/329 |

OTHER PUBLICATIONS

Non-Final Office Action dated Feb. 26, 2016, issued in the U.S. Appl. No. 14/410,553.
Final Office Action dated Sep. 8, 2016, issued in the U.S. Appl. No. 14/410,553.
Non-Final Office Action dated Jul. 12, 2017, issued in the U.S. Appl. No. 14/410,553.
Non-Final Office Action dated Dec. 28, 2017, issued in the U.S. Appl. No. 14/410,553.
Notice of Allowance dated Jun. 1, 2018, issued in the U.S. Appl. No. 14/410,553.
Panasonic, R1-110195, SORTD configurations for ACK/NACK information and SRI, 3GPP TSG RAN WG1 #63bis, 3GPP, Jan. 31, 2011.
Office Action dated Nov. 27, 2018, issued in Korean Patent Application No. 10-2012-0066705.
Non-Final Office Action dated Sep. 6, 2019, in U.S. Appl. No. 16/145,091.

* cited by examiner

METHOD FOR SIMULTANEOUS TRANSMISSION OF CONTROL SIGNALS, TERMINAL THEREFOR, METHOD FOR RECEIVING CONTROL SIGNAL, AND BASE STATION THEREFOR

CROSS-REFERENCE TO RELATED APPLICATIONS

This application is a Continuation Application of U.S. application Ser. No. 16/145,091, filed Sep. 27, 2018, which is a Continuation of application Publication Ser. No. 14/410,553, filed on Dec. 22, 2014, now U.S. Pat. No. 10,098,141, issued Oct. 9, 2018, which is a National Stage Entry of International Application PCT/KR2013/005473, filed on Jun. 21, 2013, and claims priority from and the benefit of Korean Patent Application No. 10-2012-0066705, filed on Jun. 21, 2012, both of which are incorporated herein by reference for all purposes as if fully set forth herein.

BACKGROUND

Field

The present invention relates to a method and apparatus for simultaneous transmission of control signals in a wireless communication system.

Discussion of the Background

In a wireless communication system, such as, LTE (Long Term Evolution), LTE-A (LTE-Advanced), and the like, control signals, for example, Scheduling Request (SR) information for requesting downlink transmission, ACK/NACK information for reporting whether downlink data is received, a Channel Status Information (CSI) report for reporting a quality of a downlink channel, and the like, are transmitted from a terminal to a base station through an uplink control channel (for example, a PUCCH).

For the effective use of electric wave resources, simultaneous transmission of a SR and an ACK/NACK may be considered. PUCCH transmission diversity (TxD) may be considered to secure the quality of a PUCCH, and as one of the methods, SORTD that transmits a control signal using two antennas may be considered.

SUMMARY

An aspect of the present invention is to provide a method and apparatus for simultaneous transmission of control information when a User Equipment (UE), for which channel selection and SORTD are used as a PUCCH transmission method, is required to simultaneously transmit control signals, that is, an ACK/NACK and a SR.

In accordance with an aspect of the present invention, there is provided a method for a UE to simultaneously transmit control signals, the method including: generating ACK/NACK information indicating whether downlink transmission is received; and when a scheduling request and the ACK/NACK information are simultaneously transmitted, transmitting the ACK/NACK information through an uplink control channel resource for a first antenna using the first antenna, and transmitting the ACK/NACK information through an uplink control channel resource for a second antenna using the second antenna.

In accordance with another aspect of the present invention, there is provided a UE, including: a control signal generating unit to generate ACK/NACK information indicating whether downlink transmission is received; and a transceiving unit to transmit the ACK/NACK information through an uplink control channel resource for a first antenna using the first antenna and to transmit ACK/NACK information through an uplink control channel resource for a second antenna using the second antenna, when a scheduling request and the ACK/NACK information are simultaneously transmitted.

In accordance with another aspect of the present invention, there is provided a method for a base station to receive a control signal, the method including: receiving control information through an uplink control channel resource for a first antenna of a UE and an uplink control channel resource for a second antenna of the UE when the UE simultaneously transmits a scheduling request and ACK/NACK information indicating whether downlink transmission is received; and decoding the control information.

In accordance with another aspect of the present invention, there is provided a base station, including: a transceiving unit to receive control information through an uplink control channel resource for a first antenna of a UE and an uplink control channel resource for a second antenna of the UE when the UE simultaneously transmits a scheduling request and ACK/NACK information indicating whether downlink transmission is received; and a control signal decoding unit to decode the control information.

According to the present invention, simultaneous transmission of control information may be supported when a User Equipment (UE) for which channel selection and SORTD are set as a PUCCH transmission method, is required to simultaneously transmit control signals, that is, an ACK/NACK and a SR.

DETAILED DESCRIPTION OF THE ILLUSTRATED EMBODIMENTS

Figure 1:
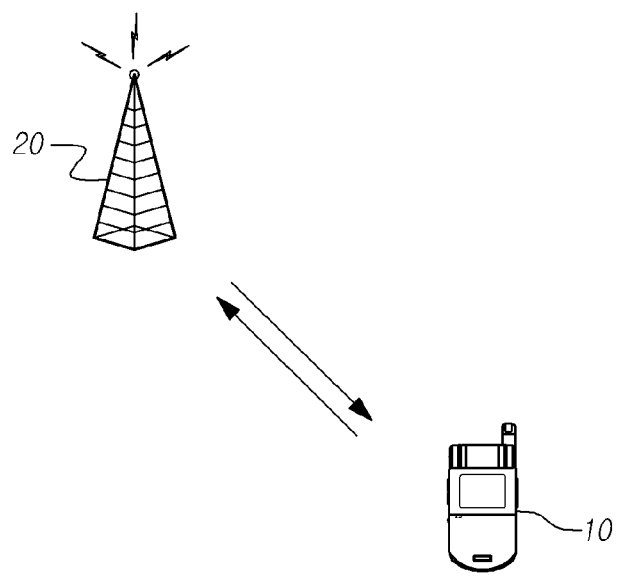
FIG. 1 illustrates an example of a wireless communication system in which a User Equipment (UE) communicates with a base station.

Hereinafter, embodiments of the present invention will be described with reference to the accompanying drawings. In the following description, the same elements will be designated by the same reference numerals although they are shown in different drawings. Further, in the following description of the present invention, a detailed description of known functions and configurations incorporated herein will be omitted when it may make the subject matter of the present invention rather unclear.

FIG. 1 illustrates an example of a wireless communication system in which a User Equipment (UE) communicates with a base station.

Referring to FIG. 1, a wireless communication system may include a User Equipment (UE) 10 and a base station 20 that executes uplink and downlink communication with the UE 10.

Throughout the specifications, the UE 10 may be an inclusive concept indicating a user terminal utilized in wireless communication, including a UE (User Equipment) in WCDMA, LTE, HSPA, and the like, and a MS (Mobile station), a UT (User Terminal), an SS (Subscriber Station), a wireless device, and the like in GSM.

The base station 20 may generally refer to a station where communication with the UE 10 is performed, and may also be referred to as a Node-B, an eNB (evolved Node-B), a Sector, a Site, a BTS (Base Transceiver System), an Access Point, a Relay Node, and the like.

In addition, the base station 20 may inclusively include various coverage areas, such as, a megacell, macrocell, a microcell, a picocell, a femtocell, an RRH (Radio Resource Head), and a relay node communication range, and the like.

The UE 10 may transmit a scheduling request (SR), a HARQ (Hybrid ARQ) A/N (ACK(acknowledge)/NACK (non-acknowledge)) information with respect to a received downlink data channel transmission block, a downlink Channel Status Information (CSI) report through an uplink control channel (for example, a PUCCH (Physical Uplink control CHannel), and may transmit uplink data through an uplink data channel (for example, a PUSCH (Physical Uplink Shared CHannel)).

In an LTE (Long Term Evolution) Rel-10 system, PUCCH format 1 may be used for transmission of a SR, PUCCH format 1a/1b may be used for transmission of an ACK/NACK, PUCCH format 2/2a/2b may be used for transmission of a CSI report, and PUCCH format 3 may be used for transmission of a plurality of ACKs/NACKs.

A complex-valued symbol or a modulation symbol d (0) used in PUCCH format 1/1a/1b are described as follows: In PUCCH format 1 for transmission of a SR, d(0)=1 is set only when a SR exists (presence) and transmission may be executed. In PUCCH format 1a, a complex-valued symbol d(0) obtained by modulating a single ACK/NACK bit based on BPSK (binary phase shift keying) may be transmitted. In PUCCH format 1b, a complex-valued symbol d(0) obtained by modulating a single ACK/NACK bit based on QPSK (quadrature phase shift keying) may be transmitted. In PUCCH format 1a/1b, a modulation symbol d(0) may be as shown in the following Table 1.

TABLE 1

| PUCCH format | b(0), ..., b($M_{bit}$ − 1) | d(0) |
|---|---|---|
| 1a | 0 | 1 |
|  | 1 | −1 |
| 1b | 00 | 1 |
|  | 01 | −j |
|  | 10 | j |
|  | 11 | −1 |

Figure 2:
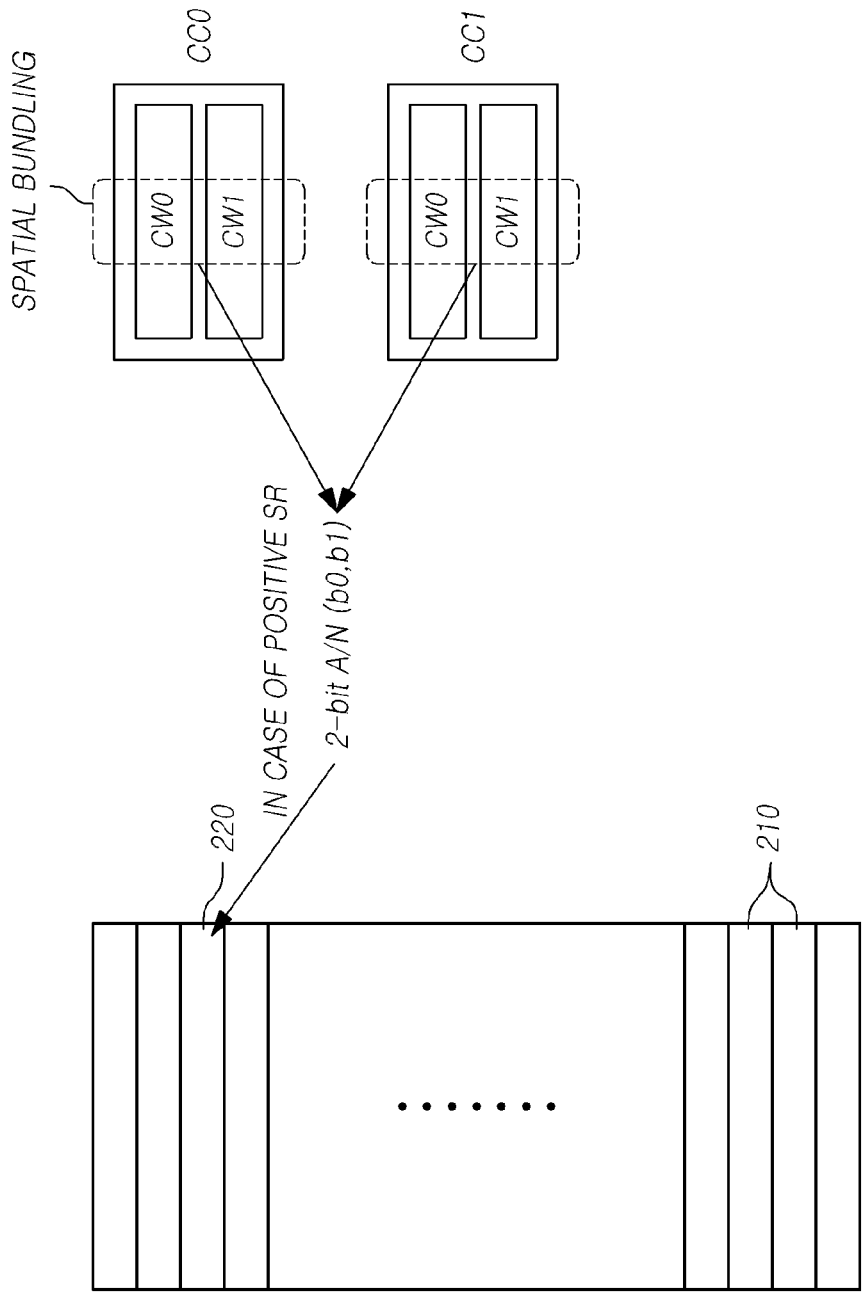
FIG. 2 is a diagram illustrating a method for simultaneous transmission of a SR and an ACK/NACK in a Carrier Aggregation (CA) environment of a FDD (Frequency Division Duplex) and TDD (Time Division Duplex) system.

FIG. 2 is a diagram illustrating a method for simultaneous transmission of a SR and an ACK/NACK in a Carrier Aggregation (CA) environment of an FDD (Frequency Division Duplex) system.

In the example of FIG. 2, a plurality of Component Carriers (CCs) CC0 and CC1 may be used for downlink communication. When component carriers CC0 and CC1 operate based on a MIMO (Multiple-Input and Multiple-Output) mode, each of the component carriers CC0 and CC1 generates ACKs/NACKs with respect to two codewords CW0 and CW1, and executes spatial bundling on the ACKs/NACKs with respect to the two codewords CW0 and CW1. Here, the spatial bundling refers to executing a logical AND operation with respect to all ACK/NACK information generated in each subframe in a single serving cell. An ACK/NACK ((b0, b1)) of two bits including a bundled ACK/NACK (b0 and b1) of one bit that is generated with respect to each component carrier CC0 and CC1, may be transmitted through PUCCH format 1b, with reference to Table 1.

When a SR is not transmitted and only an ACK/NACK is transmitted in a single subframe, the UE 10 may transmit an ACK/NACK (four bits) through an allocated ACK/NACK PUCCH resource 210, without additional spatial bundling with respect to each component carrier CC0 and CC1. When a SR and an ACK/NACK are simultaneously transmitted, the UE 10 may transmit an ACK/NACK (two bits) through a SR PUCCH resource 220.

For a TDD system, the number of ACKs/NACKs to be transmitted in a single uplink subframe may be higher (for example, when a plurality of downlink subframes is associated with a single uplink subframe).

For example, when ACK/NACK with respect to two component carriers and a plurality of downlink subframes are transmitted in a single uplink subframe, the UE 10 counts the number of ACKs that may be transmitted in two component carriers (a component carrier in a MIMO transmission mode executes counting after spatial bundling), selects b(0), b(1) corresponding to the number of ACKs based on the following Table 2, and simultaneously transmits information associated with the number of ACKs and SR information through a SR PUCCH resource that is allocated through a higher layer signaling such as an RRC (Radio Resource Control). A method of counting ACKs based on Table 2, may be applicable to an A/N bundling mode, an A/N multiplexing mode, or channel selection.

TABLE 2

| Number of ACK among multiple $\left( N_{SPS} + \sum_{c=0}^{N_{cells}^{DL}-1} U_{DAI,c} \right)$ HARQ-ACK responses | b(0), b(1) |
|---|---|
| 0 or None (UE detect at least one DL assignment is missed) | 0, 0 |
| 1 | 1, 1 |
| 2 | 1, 0 |
| 3 | 0, 1 |
| 4 | 1, 1 |
| 5 | 1, 0 |
| 6 | 0, 1 |
| 7 | 1, 1 |
| 8 | 1, 0 |
| 9 | 0, 1 |

In Table 2, $N_{SPS}$ may have a value of 0 or 1, based on whether a SPS PDSCH transmission exists within a bundling window. $U_{DAI,c}$ denotes the number of PDCCHs/

EPDCCHs that are transmitted to indicate a PDSCH and SPS release in the serving cell (c) and are received by the UE.

As another example, the method may be used as the A/N multiplexing mode in LTE Rel-8 TDD, and the channel selection method that is used for A/N transmission in FDD/TDD in CA environment of Rel-10 may be used. The channel selection method has a feature of requiring as many PUCCH format 1 resources as the number of transmitted A/N bits. Accordingly, a method of allocating a PUCCH resource may be different based on FDD/TDD, whether a MIMO transmission mode is set for each CC, whether SPS (Semi-Persistent Scheduling) is transmitted, whether self-scheduling is set, and whether cross-scheduling is set. According to the present method, a UE extracts a related PUCCH resource and information corresponding to b(0), b(1) from A/N information corresponding to a PDCCH indicating a decoded PDSCH or SPS release, through a channel selection mapping table (for example, Table 3 as shown below), and transmits the same to a base station through PUCCH format b1.

For example, when it corresponds to FDD and A=2, the following Table 3 may be used. Here, A denotes the number of A/N bits to be transmitted.

TABLE 3

| HARQ-ACK(0) | HARQ-ACK(1) | $n_{PUCCH}^{(1)}$ | b(0)b(1) |
|---|---|---|---|
| ACK | ACK | $n_{PUCCH,1}^{(1)}$ | 1, 1 |
| ACK | NACK/DTX | $n_{PUCCH,0}^{(1)}$ | 1, 1 |
| NACK/DTX | ACK | $n_{PUCCH,1}^{(1)}$ | 0, 0 |
| NACK | NACK/DTX | $n_{PUCCH,0}^{(1)}$ | 0, 0 |
| DTX | NACK/DTX | No Transmission | |

For example, when HARQ-ACK(0) is ACK, HARQ-ACK(1) is NACK/DTX, b(0),b(1)=1,1 may be transmitted through PUCCH format 1b in a resource determined based on $n_{PUCCH,0}^{(1)}$.

Table 3 illustrates an example when A=2, a table associated with a case in which A=3 or 4 may exist.

A Spatial Orthogonal Resource Transmit Diversity (SORTD) technology may be used for PUCCH transmission. SORTD is a method of transmitting identical control information through a plurality of transmission antennas, and each antenna uses different PUCCH resources. The method generally requires the use of PUCCH resources two times greater than a transmission using a single antenna, but may be advantageous in that the reliability of a PUCCH channel that is transmitted in an uplink is improved.

In an embodiment, in FDD, a SR PUCCH resource for a second antenna AP #1 may be allocated in addition to a SR PUCCH resource for a first antenna AP #0 (this may be identical to the SR PUCCH resource of FIG. 2).

Figure 3:
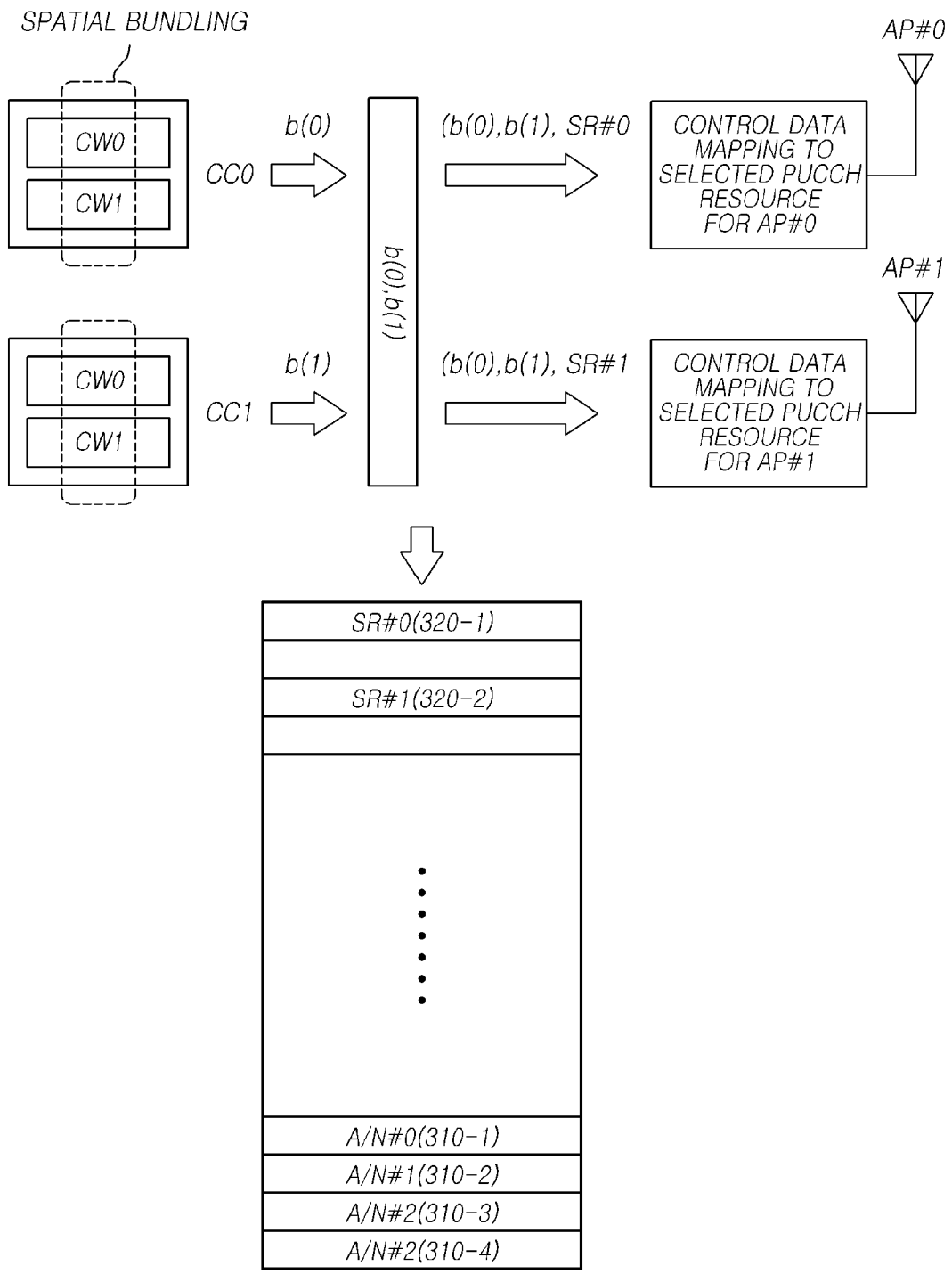
FIG. 3 is a diagram illustrating an example in which a single SR resource is added in FDD.

FIG. 3 is a diagram illustrating an example in which a single SR resource is added.

A PUCCH resource may be configured using a Frequency Division Multiplexing (FDM) and Code Division Multiplexing (CDM). That is, a total of 36 resources may be code division multiplexed (CDM) using Zadoff-Chu sequence in each of the configured PUCCH Physical Resource Block (PRB) pairs.

Referring to FIG. 3, resources for an uplink may include ACK/NACK PUCCH resources 310-1 to 310-4, a SR PUCCH resource 320-1 for the first antenna AP #0, and a SR PUCCH resource 320-2 for the second antenna AP #1. When SORTD is configured together with channel selection, the SR PUCCH resource 320-2 for the second antenna AP #1 may be additionally allocated through a higher layer signaling such as an RRC.

In the example of FIG. 3, a plurality of component carriers CC0 and CC1 may be used for downlink communication. When component carriers CC0 and CC1 operate based on a MIMO transmission mode (when a transmission mode that transmits two codewords is configured), the component carriers CC0 and CC1 generate ACKs/NACKs with respect to two codewords CW0 and CW1, and execute spatial bundling with respect to the ACKs/NACKs with respect to the two codewords CW0 and CW1. When a transmission mode that transmits a single codeword is configured, the spatial bundling is not executed. An ACK/NACK ((b0, b1)) of two bits including a bundled ACK/NACK (b0 and b1) of one bit that is generated with respect to each component CC0 and CC1 may be transmitted through PUCCH format 1b, with reference to Table 1.

When a SR is not transmitted and only an ACK/NACK is transmitted in a single subframe, the UE 10 may transmit an ACK/NACK (four bits) through allocated ACK/NACK PUCCH resources 310-1 to 310-4, based on a general channel selection transmission method.

In a case in which the UE simultaneously transmits a SR and an ACK/NACK in an environment where SORTD and a CA are configured by a base station, the UE 10 transmits ACK/NACK information (two bits) through the SR PUCCH resource 320-1 using the first antenna AP #0, and transmits ACK/NACK information (two bits) which is identical to the ACK/NACK information transmitted through the first antenna AP #0, through the SR PUCCH resource 320-2 for the second antenna AP #1 using the second antenna AP #1.

The ACK/NACK information b(0), b(1) transmitted in this manner may be transmitted through the SR PUCCH resource 320-1 and 320-2 and thus, the base station may simultaneously receive the ACK/NACK information and SR information reported by the corresponding UE in a single subframe.

Although the above described example illustrates a case in which two component carriers CC0 and CC1 correspond to a two-codeword transmission mode (with spatial bundling), the method may be applicable to a case in which two component elements correspond to a single-codeword transmission mode (without spatial bundling) or a case in which one component carrier corresponds to a two-codeword transmission mode and the other component carrier corresponds to a single-codeword transmission mode.

Figure 4:
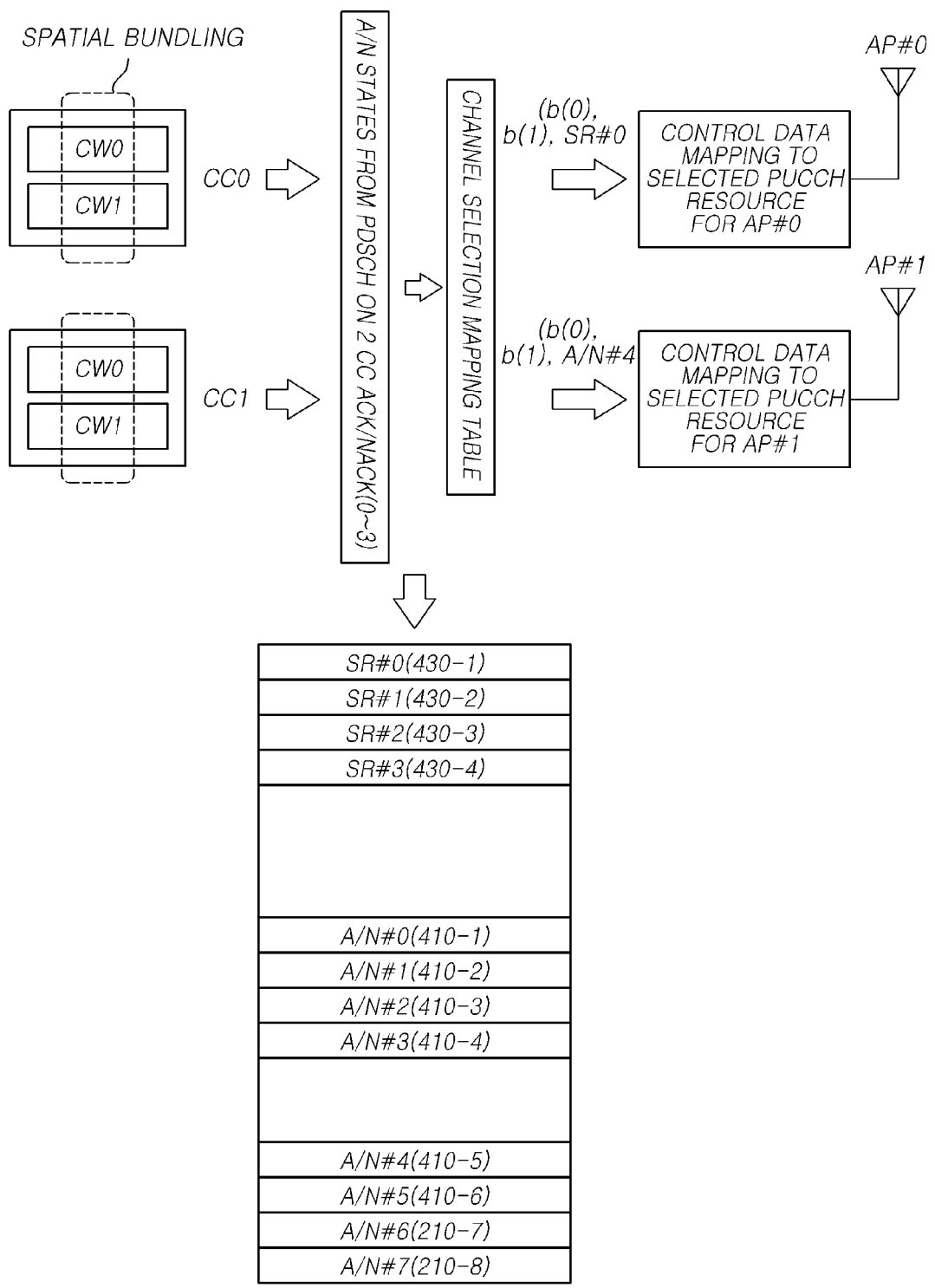
FIG. 4 is a diagram illustrating an example in which a plurality of SR resources is added in FDD.

FIG. 4 is a diagram illustrating an example in which a plurality of SR resources is added.

A PUCCH resource may be configured using a Frequency Division Multiplexing (FDM) and Code Division Multiplexing (CDM). That is, a total of 36 resources may be code division multiplexed (CDM) using Zadoff-Chu sequence in each of the configured PUCCH Physical Resource Block (PRB) pairs.

Referring to FIG. 4, resources for an uplink may include ACK/NACK PUCCH resources 410-1 to 410-4 for a first antenna AP #0, ACK/NACK PUCCH resources 410-5 to 410-8 for a second antenna AP #2, and a SR PUCCH resources 420-1 to 420-4 for the first antenna AP #0.

In the example of FIG. 4, the plurality of SR PUCCH resources 420-1 to 420-4 receive an allocation of a plurality of SR resources on a predetermined single antenna port or all of the antenna ports and execute channel selection transmission, on behalf of the existing ACK/NACK PUCCH resources 410-1 to 410-4. The number of SR PUCCH resources 420-1 to 420-4 may be equal to the number of ACK/NACK bits or a product of the number of ACK/NACK bits and the number of antennas. The example of FIG. 4 is an example of transmission utilizing SR PUCCH resources on a single antenna, and two codewords are transmitted based on a MIMO transmission mode for each of the two component carriers CC0 and CC1 and the number of ACK/NACK bits is four bits and thus, the number of SR PUCCH resources may be four.

When a SR is not transmitted and only an ACK/NACK is transmitted in a single subframe, the UE 10 may transmit an ACK/NACK (four bits) through allocated ACK/NACK PUCCH resources 410-1 to 410-4 using the first antenna, and may transmit an ACK/NACK (four bits) that is identical to the ACK/NACK transmitted through the first antenna, through the ACK/NACK PUCCH resources 410-5 to 410-8 using the second antenna.

In a case in which the UE simultaneously transmits a SR and an ACK/NACK in an environment where SORTD and a CA are configured by the base station, the UE 10 transmits ACK/NACK information through the SR PUCCH resources 420-1 to 420-4 for the first antenna AP #0 using the first antenna AP #0, transmits ACK/NACK information through the ACK/NACK PUCCH resources 410-5 to 410-8 for the second antenna AP #1 using the second antenna AP #1.

The example of FIG. 4 requires a larger amount of resources compared to the example of FIG. 3, but may be advantageous in that the performance is improved since transmission is executed without spatial bundling.

Figure 5:
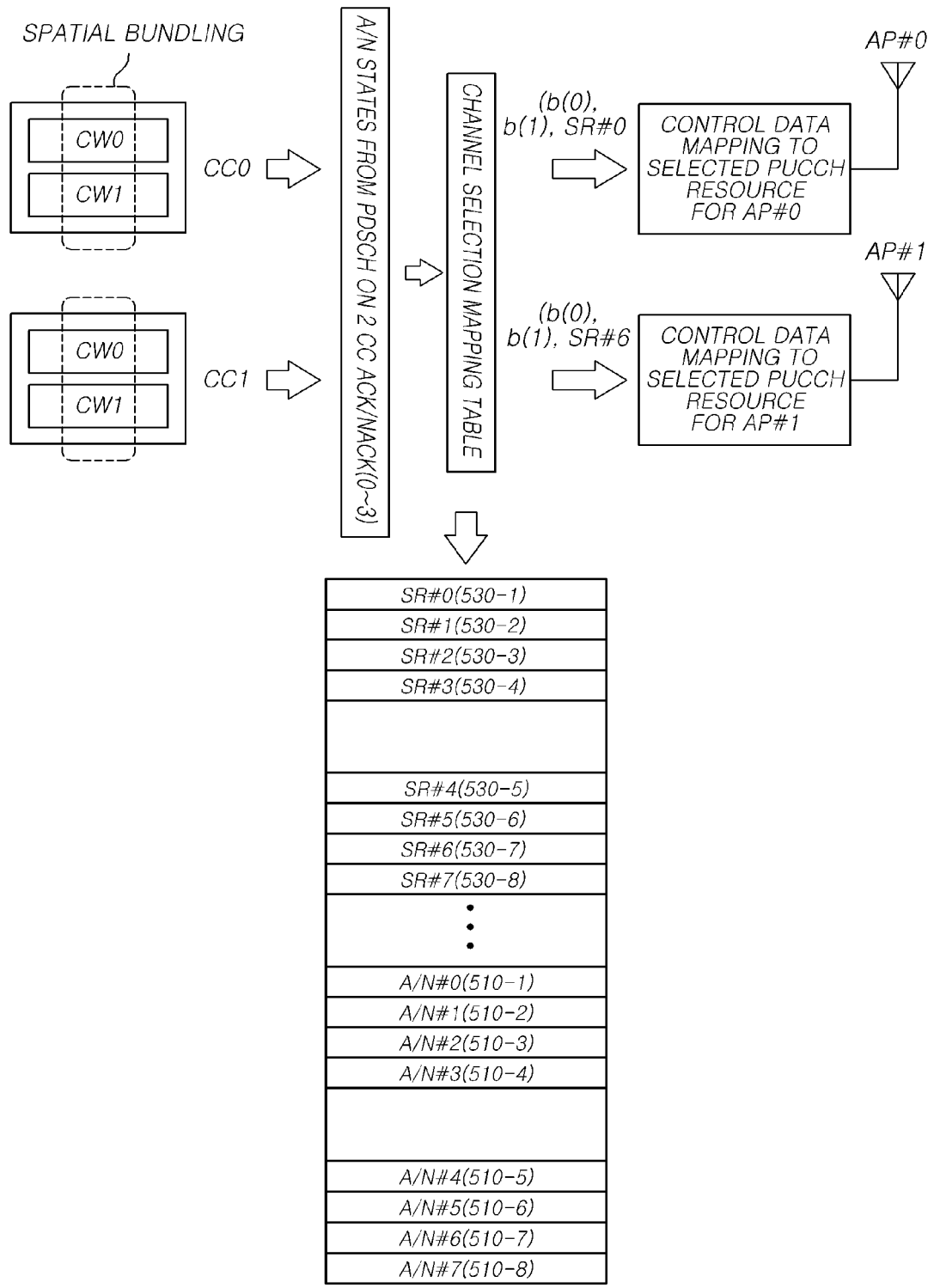
FIG. 5 is a diagram illustrating another example in which a plurality of SR resources is added in FDD.

FIG. 5 is a diagram illustrating an example in which a plurality of SR resources is added.

A PUCCH resource may be configured using a Frequency Division Multiplexing (FDM) and Code Division Multiplexing (CDM). That is, a total of 36 resources may be code division multiplexed (CDM) using Zadoff-Chu sequence in each of the configured PUCCH Physical Resource Block (PRB) pairs.

Referring to FIG. 5, resources for an uplink may include ACK/NACK PUCCH resources 510-1 to 510-4 for a first antenna AP #0, ACK/NACK resources 510-5 to 510-8 for a second antenna AP #1, SR PUCCH resources 520-1 to 520-4 for the first antenna AP #0, and SR PUCCH resources 520-5 to 520-8 for the second antenna AP #1.

In the example of FIG. 5, the plurality of SR PUCCH resources 520-1 to 520-8 receive an allocation of a plurality of SR resources on a predetermined single antenna port or all of the antenna ports and execute channel selection transmission, on behalf of the existing ACK/NACK PUCCH resources 510-1 to 510-8. The number of SR PUCCH resources 520-1 to 520-8 may be equal to the number of ACK/NACK bits or a product of the number of ACK/NACK bits and the number of antennas. The example of FIG. 5 is an example of transmission utilizing SR PUCCH resources on two antennas, and two codewords are transmitted based on a MIMO transmission mode for each of the two component carriers CC0 and CC1 and the number of ACK/NACK bits is four bits and thus, the number of SR PUCCH resources may be 8.

When a SR is not transmitted and only an ACK/NACK is transmitted in a single subframe, the UE 10 transmits ACK/NACK information through the ACK/NACK PUCCH resources 510-1 to 510-4 for the first antenna AP #0 using the first antenna AP #0, and transmits ACK/NACK information through ACK/NACK PUCCH resources 510-5 to 510-8 for the second antenna AP #1 using the second antenna AP #1.

In a case in which the UE simultaneously transmits a SR and an ACK/NACK in an environment where SORTD and a CA are configured by the base station, the UE 10 transmits ACK/NACK information through the SR PUCCH resources 520-1 to 520-4 for the first antenna AP #0 using the first antenna AP #0, and transmits ACK/NACK information through the SR PUCCH resources 510-5 to 510-8 for the second antenna AP #1 using the second antenna AP #1.

The example of FIG. 5 executes transmission through a plurality of antennas using SR PUCCH resources and may enhance the SR reception performance, compared to transmission that utilizes SR PUCCH resources through only a predetermined antenna as shown in the example of FIG. 4. Therefore, the base station may indicate an additional configuration (for example, the number of available SR PUCCH resources, the number of antennas or antenna port numbers where SR PUCCH resources may be used) by taking into consideration an amount of SR PUCCH resources required, SR reception performance, downlink throughput, and the like, with reference to a degree of utilization of a SR PUCCH resource, using a method determined for the UE. Therefore, the base station may select an antenna through which SR information is transmitted to the UE.

An additional SR PUCCH resource that is required for simultaneous transmission of a SR and ACK/NACK information may be transferred through uplink signaling such as RRC (Radio Resource Control) signaling.

In addition, the additional SR PUCCH resource may be implicitly or explicitly transferred through a PDCCH.

For example, in a case of self-scheduling, based on a CCE (control channel elements) index of a PDCCH for PDSCH scheduling or a CCE (control channel elements) index of a PDCCH indicating SPS release, which is transmitted on the PCell, a SR PUCCH resource may be induced using a CCE index that is different from a CCE index used for the SORTD transmission corresponding to an existing method of transmitting only an ACK/NACK through a plurality of antennas, and channel selection transmission. For example, a value obtained by adding a predetermined number to a first CCE index $n_{CCE}$ of the PDCCH (for example, $n_{CCE}+2$, $n_{CCE}+3$, and the like), or another CCE index may be used for additional SR PUCCH resource allocation.

When existing SORTD and the channel selection transmission method are simultaneously set using an ARI (Acknowledgement Resource indication) that reuses a TPC field in a DCI (Downlink Control Information) that transmits downlink control information which is transmitted on the SCell, a SR PUCCH resource may be indicated in addition to an explicit resource. For example, as shown in the following Table 4, a value of an ARI field (a value of a TPC command for a PUCCH) may indicate information $n_{PUCCH,j}^{(1)}$ associated with a PUCCH resource for an ACK/NACK or information ($n_{PUCCH,j}^{(1)}$, $n_{PUCCH,j+1}^{(1)}$, $n_{PUCCH,j+2}^{(1)}$, $n_{PUCCH,j+3}^{(1)}$) associated with a PUCCH resource for an additional SR.

TABLE 4

| Value of 'TPC command for PUCCH' | $n_{PUCCH,j}^{(1)}$ or ($n_{PUCCH,j}^{(1)}$, $n_{PUCCH,j+1}^{(1)}$, $n_{PUCCH,j+2}^{(1)}$, $n_{PUCCH,j+3}^{(1)}$) |
|---|---|
| '00' | The 1$^{st}$ PUCCH resource value configured by the higher layers |
| '01' | The 2$^{nd}$ PUCCH resource value configured by the higher layers |
| '10' | The 3$^{rd}$ PUCCH resource value configured by the higher layers |
| '11' | The 4$^{th}$ PUCCH resource value configured by the higher layers |

As another example, in a case of cross-carrier scheduling, based on a CCE (control channel elements) index of a PDCCH for PDSCH scheduling or a CCE (control channel elements) index of a PDCCH indicating SPS release, which is transmitted on the PCell, a SR PUCCH resource may be derived using a CCE index that is different from a CCE index used for the existing SORTD and the channel selection transmission method. For example, a value obtained by adding a predetermined number to a first CCE index $n_{CCE}$ of the PDCCH (for example, $n_{CCE}+2$, $n_{CCE}+3$, and the like), or another CCE index may be used for additional SR PUCCH resource allocation.

In another embodiment, in TDD, a SR PUCCH resource for a second antenna AP #1 may be allocated in addition to a SR PUCCH resource for a first antenna AP #0 (this may be identical to the SR PUCCH resource of FIG. 2).

Figure 6:
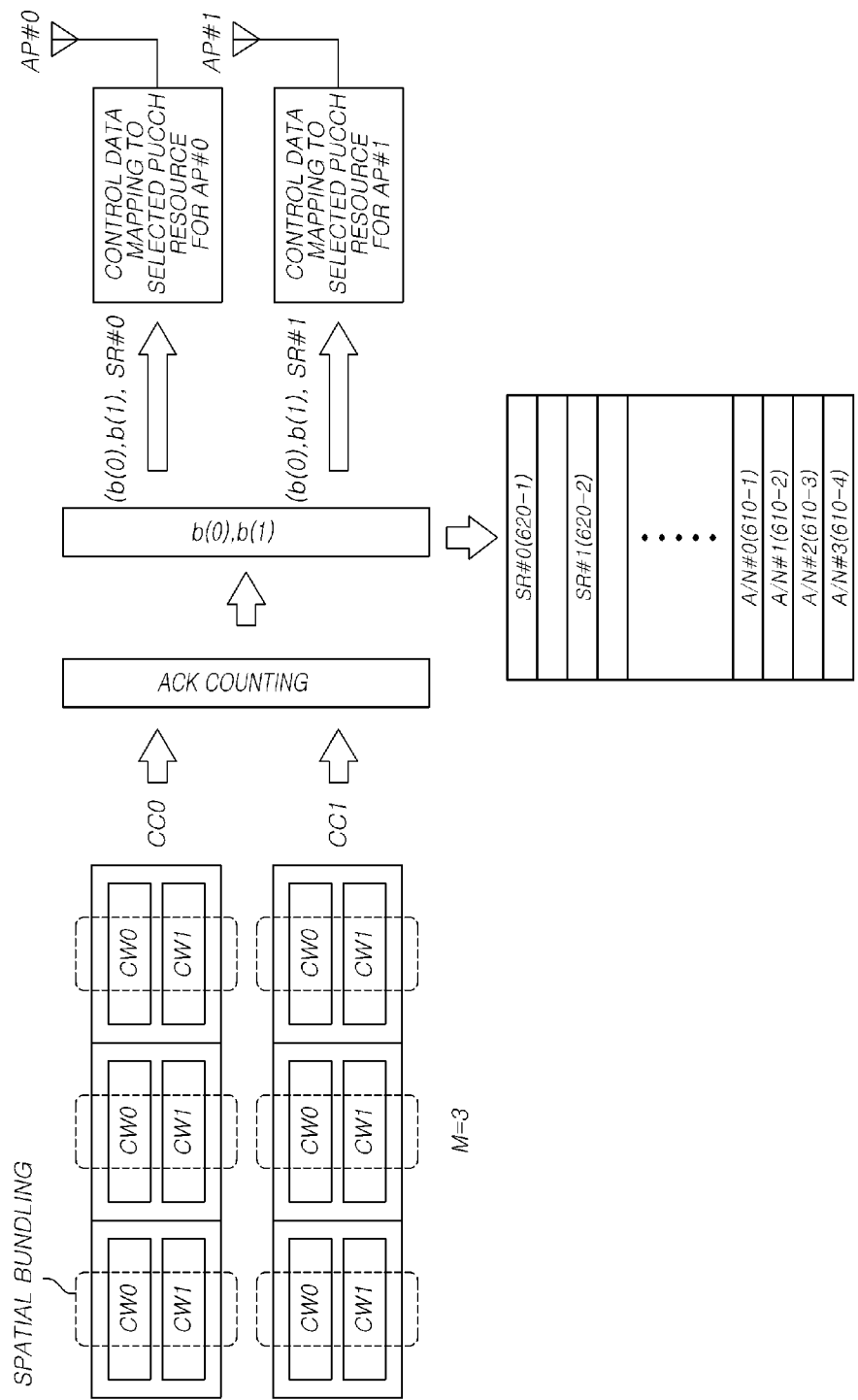
FIG. 6 is a diagram illustrating an example in which a single SR resource is added in TDD.

FIG. 6 is a diagram illustrating an example in which a single SR resource is added.

A PUCCH resource may be configured using a Frequency Division Multiplexing (FDM) and Code Division Multiplexing (CDM). That is, a total of 36 resources may be code division multiplexed (CDM) using Zadoff-Chu sequence in each of the configured PUCCH Physical Resource Block (PRB) pairs.

Referring to FIG. 6, resources for an uplink may include, for example, ACK/NACK PUCCH resources 610-1 to 610-4, a SR PUCCH resource 620-1 for a first antenna AP #0, and a SR PUCCH resource 620-2 for a second antenna AP #1, which are distinguished by frequency. When SORTD is configured together with channel selection, the SR PUCCH resource 620-2 for the second antenna AP #1 may be additionally allocated through an RRC.

In the example of FIG. 6, the number of downlink subframes associated with a predetermined uplink subframe, that is, the number (M) of downlink subframes for which an ACK/NACK is transmitted through the predetermined subframe, is 3, and 2 component carriers CC0 and CC1 may be used for downlink communication.

In the example of FIG. 6, a TDD configuration may correspond to one of 1, 2, 3, 4, and 6 (for TDD configuration 0, M is always 1, and TDD configuration 5 does not support the channel selection transmission method). Through the method of simultaneously transmitting an ACK/NACK and a SR in the TDD configuration, ACKs with respect to each downlink subframe and component carrier may be counted, and b(0), b(1) corresponding to the number of ACKs may be extracted with reference to Table 2. When each component carrier operates in a MIMO mode, spatial bundling may be executed. Otherwise, spatial bundling may not be executed.

When a SR is not transmitted and only an ACK/NACK is transmitted in a single subframe, the UE 10 may transmit an ACK/NACK (four bits) using allocated ACK/NACK PUCCH resources 610-1 to 610-4, through a single antenna. When SORTD is used, additional ACK/NACK PUCCH resource may be required.

When a SR and an ACK/NACK are simultaneously transmitted, the UE 10 transmits ACK/NACK information (two bits) through the SR PUCCH resource 620-1 for the first antenna AP #0, using the first antenna AP #0, and transmits ACK/NACK information (two bits) which is identical to the ACK/NACK information transmitted using the first antenna AP #0, through the SR PUCCH resource 620-2 for the second antenna AP #1 using the second antenna AP #1.

The ACK/NACK information b(0), b(1) transmitted in this manner may be transmitted through the SR PUCCH resources 620-1 and 620-2 and thus, a base station may simultaneously receive the ACK/NACK information and SR information reported by the corresponding UE in a single subframe.

In another embodiment, when PUCCH format 1b is mapped to a PUCCH resource selected through the channel selection method and QPSK symbol information of b(0), b(1), phase shifting may be applied to information that is allocated to a second slot of a single subframe in the PUCCH format 1. When an ACK/NACK is transmitted without a SR, ACK/NACK information is transmitted based on an identical phase in both a first slot and a second slot according to the existing channel selection method. However, when an ACK/NACK is transmitted together with a SR, ACK/NACK information may be transmitted based on the existing channel selection method in the first slot, and phase shifting may be applied to the ACK/NACK information transmitted in the first slot for transmission in the second slot. The base station may determine whether a SR is transmitted based on whether phase shifting exists between the first slot and the second slot.

In particular, a complex-valued symbol d(0) of Table 1 may be multiplexed as a sequence $r_{u,v}^{(\alpha_{\tilde{p}})}(n)$ as shown in the following Equation 1. In this instance, the length of the sequence $r_{u,v}^{(\alpha_{\tilde{p}})}(n)$ may be $N_{seq}^{PUCCH}=12$, is CAZAC (Constant Amplitude Zero Auto-Correlation) sequence that is obtained through cyclic shifting by $\alpha_{\tilde{p}}(n_s,l)$.

$$y^{(\tilde{p})}(n) = \frac{1}{\sqrt{P}}d(0) \cdot r_{u,v}^{(\alpha_{\tilde{p}})}(n), n = 0, 1, \ldots, N_{seq}^{PUCCH}-1 \quad \text{Equation 1}$$

A block $y^{(\tilde{p})}(0), \ldots, y^{(\tilde{p})}(N_{seq}^{PUCCH}-1)$ of the complex-valued symbols may be scrambled as a sequence $s(n_s)$ as shown in Equation 2, and is spread as an orthogonal sequence $$w_{n_{OC}^{(\tilde{p})}}(i)$$

that is defined for each antenna.

$$z^{(\tilde{p})}(m' \cdot N_{SF}^{PUCCH} \cdot N_{seq}^{PUCCH} + m \cdot N_{seq}^{PUCCH} + n) = \quad \text{Equation 2}$$
$$S(n_s) \cdot w_{n_{OC}^{(\tilde{p})}}(m) \cdot y^{(\tilde{p})}(n)$$
$$m = 0, \ldots, N_{SF}^{PUCCH}-1$$
$$n = 0, \ldots, N_{seq}^{PUCCH}-1$$
$$m' = 0, 1$$

In Equation 2, m'=0 denotes a first slot in a single subframe, and m'=1 denotes a second slot in the single subframe. In addition, m denotes an index of a symbol for PUCCH format 1/1a/1b transmission used in the single slot, and a total number of symbols used for PUCCH format 1/1a/1b transmission used in the single slot may be the number $N_{SF}^{PUCCH}$ of spreading factors (SFs) of an orthogonal sequence. In this instance, for normal PUCCH format 1/1a/1b transmission, $N_{SF}^{PUCCH}$ is 4. For shortened PUCCH format 1/1a/1b transmission, $N_{SF}^{PUCCH}$ is 4 in the first slot and $N_{SF}^{PUCCH}$ is 3 in the second slot n denotes an index of a subcarrier for PUCCH format 1/1a/1b transmission in a single resource block (RB), and the total number of subcarriers for PUCCH format 1/1a/1b transmission in a single resource block (RB) corresponds to a length $N_{seq}^{PUCCH}=12$ of a sequence.

The orthogonal sequence $$w_{n_{oc}^{(\tilde{p})}}(i)$$

for spreading may be defined by the following Equation 3 and Table 5 (for a normal CP (normal cyclic prefix) or Table 6 (for an extended CP (extended cyclic prefix).

$$n_{oc}^{(\tilde{p})}(n_s) = \begin{cases} \lfloor n'_{\tilde{p}}(n_s) \cdot \Delta_{shift}^{PUCCH}/N' \rfloor + 3 \cdot m' \cdot d(0)_{SR} & \text{for normal cyclic prefix} \\ 2 \cdot \lfloor n'_{\tilde{p}}(n_s) \cdot \Delta_{shift}^{PUCCH}/N' \rfloor + 3 \cdot m' \cdot d(0)_{SR} & \text{for extended cyclic prefix} \end{cases}$$

Equation 3

TABLE 5

| Sequence index $n_{oc}^{(\tilde{p})}(n_s)$ | Orthogonal sequences $[w(0) \ldots w(N_{SF}^{PUCCH} - 1]$ |
|---|---|
| 0 | [+1 +1 +1 +1] |
| 1 | [+1 −1 +1 −1] |
| 2 | [+1 −1 −1 +1] |
| 3 | [−1 −1 −1 −1] |
| 4 | [−1 +1 −1 +1] |
| 5 | [−1 +1 +1 −1] |

TABLE 6

| Sequence index $n_{oc}^{(\tilde{p})}(n_s)$ | Orthogonal sequences $[w(0) \ldots w(N_{SF}^{PUCCH} - 1)]$ |
|---|---|
| 0 | [+1 +1 +1] |
| 1 | [1 $e^{j2\pi/3}$ $e^{j4\pi/3}$] |
| 2 | [1 $e^{j4\pi/3}$ $e^{j2\pi/3}$] |
| 3 | [−1 −1 −1] |
| 4 | [−1 $e^{j5\pi/3}$ $e^{j\pi/3}$] |
| 5 | [1 $e^{j\pi/3}$ $e^{j5\pi/3}$] |

In Equation 3, $\Delta_{shift}^{PUCCH}$ and N' are set from a higher layer or set in a system, and may be used for various parameter values used in PUCCH format 1/1a/1b. m'=0 denotes a first slot in a single subframe, and m'=1 denotes a second slot in the single subframe. $d(0)_{SR}$ is a parameter for SR transmission, and $d(0)_{SR}$=1 when a SR exists, and $d(0)_{SR}$=0 when a SR does not exist. When a SR is not transmitted, $n_{oc}^{(\tilde{p})}(n_s)$ may have a value from 0 to 2 in both the first slot and the second slot. When a SR is transmitted, $n_{oc}^{(\tilde{p})}(n_s)$ may have a value from 0 to 2 in the first slot and $n_{oc}^{(\tilde{p})}(n_s)$ may have a value rising by 3 in comparison to the first slot, in the second slot.

Alternatively, to generate an identical orthogonal sequence, the following Equation 4 may be used instead of Equation 2, the following Equation 5 may be used instead of Equation 3, and the following Table 7 and Table 8 may be used instead of Table 5 and Table 6.

$$z^{(\tilde{p})}(m' \cdot N_{SF}^{PUCCH} \cdot N_{seq}^{PUCCH} + m \cdot N_{seq}^{PUCCH} + n) = \\ (-1)^{m' \cdot d(0)_{SR}} \cdot S(n_s) \cdot w_{n_{oc}^{(\tilde{p})}}(m) \cdot y^{(\tilde{p})}(n)$$

Equation 4

$m = 0, \ldots, N_{SF}^{PUCCH} - 1$
$n = 0, \ldots, N_{seq}^{PUCCH} - 1$
$m' = 0, 1$ $$n_{oc}^{(\tilde{p})}(n_s) = \begin{cases} \lfloor n'_{\tilde{p}}(n_s) \cdot \Delta_{shift}^{PUCCH}/N' \rfloor & \text{for normal cyclic prefix} \\ 2 \cdot \lfloor n'_{\tilde{p}}(n_s) \cdot \Delta_{shift}^{PUCCH}/N' \rfloor & \text{for extended cyclic prefix} \end{cases}$$

Equation 5

TABLE 7

| Orthogonal sequences $[w(0) \ldots w(N_{SF}^{PUCCH} - 1]$ | Sequence index $n_{oc}^{(\tilde{p})}(n_s)$ in $1^{st}$ slot | Sequence index $n_{oc}^{(\tilde{p})}(n_s)$ in $2^{nd}$ slot |
|---|---|---|
| [+1 +1 +1 +1 +1 +1 +1] | 0 ([+1 +1 +1]) | 0 ([+1 +1 +1 +1]) |
| [+1 −1 +1 −1 +1 −1 + 1] | 1 ([+1 −1 +1 −1]) | 1 ([+1 −1 +1 −1]) |
| [+1 −1 −1 +1 −1 −1 + 1] | 2 ([+1 −1 −1 +1]) | 2 ([+1 −1 −1 +1]) |
| [+1 +1 +1 +1 −1 −1 −1 −1] | 0 ([+1 +1 +1 +1]) | 3 ([−1 −1 −1 −1]) |
| [+1 −1 +1 −1 −1 +1 −1 +1] | 1 ([+1 −1 +1 −1]) | 4 ([−1 +1 −1 +1]) |
| [+1 −1 −1 +1 −1 +1 +1 − 1] | 2 ([+1 −1 −1 +1]) | 5 ([−1 +1 +1 −1]) |

TABLE 8

| Orthogonal sequences $[w(0) \ldots w(N_{SF}^{PUCCH} - 1)]$ | Sequence index $n_{oc}^{(\tilde{p})}(n_s)$ in $1^{st}$ slot | Sequence index $n_{oc}^{(\tilde{p})}(n_s)$ in $2^{nd}$ slot |
|---|---|---|
| [+1 +1 +1 +1 +1 +1] | 0 ([+1 +1 +1]) | 0 (+1 +1 +1]) |
| [+1 $e^{j2\pi/3}$ $e^{j4\pi/3}$ +1 $e^{j2\pi/3}$ $e^{j4/3}$] | 1 ([1 $e^{j2\pi/3}$ $e^{j4/3}$]) | 1 ([1 $e^{j2\pi/3}$ $e^{j4\pi/3}$]) |
| [+1 $e^{j4\pi/3}$ $e^{j2\pi/3}$+1 $e^{j4\pi/3}$ $e^{j2/3}$] | 2 ([1 $e^{j4\pi/3}$ $e^{j2/3}$]) | 2 ([1 $e^{j4\pi/3}$ $e^{j2\pi/3}$]) |
| [+1 +1 +1 −1 −1 −1] | 0 ([+1 +1 +1]) | 3 ([−1 −1 −1]) |
| [+1 $e^{j2\pi/3}$ $e^{j4\pi/3}$ −1 $e^{j5\pi/3}$ $e^{j/3}$] | 1 ([1 $e^{j2\pi/3}$ $e^{j4/3}$]) | 4 ([−1 $e^{j5\pi/3}$ $e^{j\pi/3}$]) |
| [+1 $e^{j2\pi/3}$ −1 $e^{j\pi/3}$ $e^{j5\pi/3}$] | 2 ([1 $e^{j4\pi/3}$ $e^{j2/3}$]) | 5 ([1 $e^{j\pi/3}$ $e^{j5\pi/3}$]) |

In Equation 4, m'=0 denotes a first slot in a single subframe, and m'=1 denotes a second slot in the single subframe. $d(0)_{SR}$ is a parameter for SR transmission, and $d(0)_{SR}$=1 when a SR exists, and $d(0)_{SR}$=0 when a SR does not exist. When a SR is not transmitted, complex-valued symbols in the first slot and the second slot may have an identical phase. When a SR is transmitted, a complex-valued symbol in the first slot and a complex-valued symbol in the second slot may have a phase difference of 180 degrees and have different signs.

Figure 7:
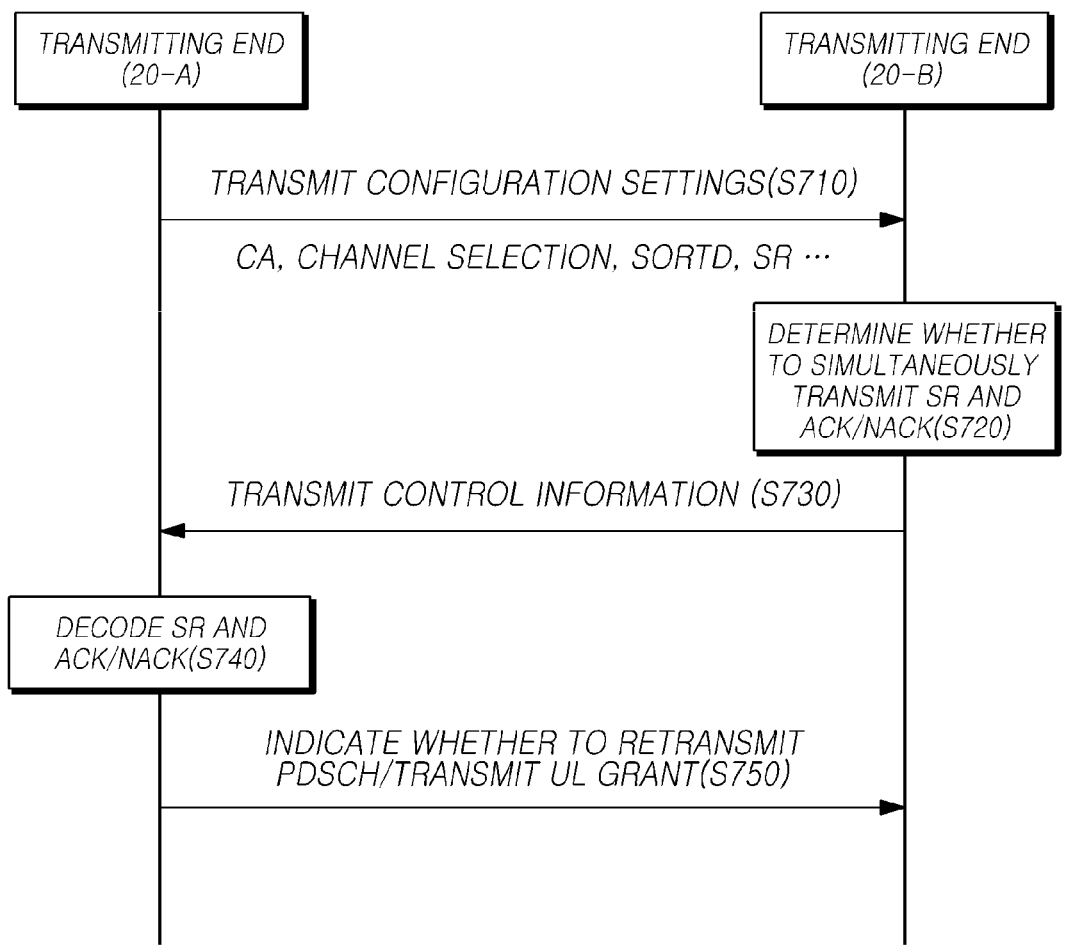
FIG. 7 illustrates a method of transmitting an uplink control signal according to an embodiment of the present invention.

FIG. 7 illustrates a method of transmitting an uplink control signal according to an embodiment of the present invention.

Referring to FIG. 7, a base station transfers, to a UE, information associated with a Carrier Aggregation (CA), channel selection, SORTD, a SR configuration, and the like through an uplink signaling such as an RRC, in operation S710.

The UE determines whether to execute simultaneous transmission of a SR and an ACK/NACK through a PUCCH in a predetermined subframe in operation S720, and when there is a determination to execute the simultaneous transmission of a SR and an ACK/NACK through a PUCCH, the UE simultaneously transmits the SR and the ACK.NACK in an identical subframe based on one of the above described embodiments in operation S730. In this instance, the SR and the ACK/NACK information may be transmitted through two antennas. The base station decodes the SR and the ACK/NACK from the received control information in operation S740.

The base station determines whether to retransmit data through a PDSCH based on the ACK/NACK information and/or whether to transmit a UL grant based on the SR information, and indicates the determination to the UE in operation S750.

Figure 8:
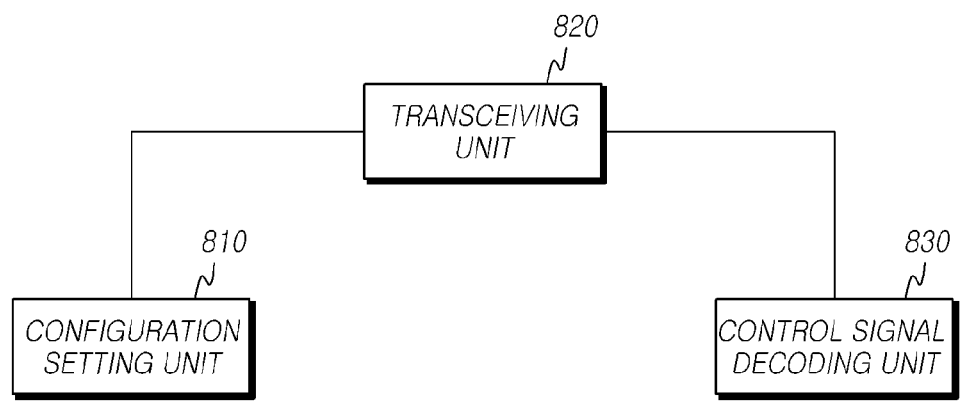
FIG. 8 is a block diagram illustrating a configuration of a base station according to an embodiment of the present invention.

FIG. 8 is a block diagram illustrating a configuration of a base station according to an embodiment of the present invention.

Referring to FIG. 8, a base station 800 includes a configuration setting unit 810, a transceiving unit 820, and a control signal decoding unit 830.

The configuration setting unit 810 may set a Carrier Aggregation (CA), channel selection, SORTD, a SR configuration, and the like. The information set in the configuration setting unit 810 may be transferred to the terminal through the transceiving unit 820 using an RRC.

The transceiving unit 820 receives uplink control information from the UE. The control information may include SR information and ACK/NACK information. Identical control information may be transferred through the two antennas. The control signal decoding unit 830 may decode the control information received by the transceiving unit 820, so as to extract the SR information and the ACK/NACK information.

Figure 9:
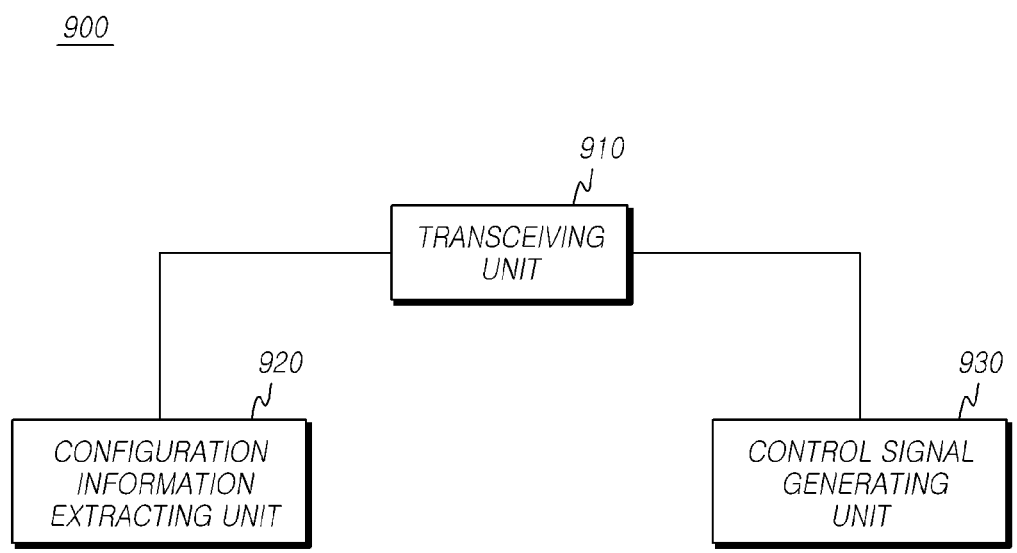
FIG. 9 is a block diagram illustrating a configuration of a UE according to an embodiment of the present invention.

FIG. 9 is a block diagram illustrating a configuration of a UE according to an embodiment of the present invention.

Referring to FIG. 9, a UE 900 includes a transceiving unit 910, a configuration information extracting unit 920, and a control signal generating unit 930.

The transceiving unit 910 receives, from a base station through an RRC, a signal including information associated with a Carrier Aggregation (CA), channel selection, SORTD, a SR configuration, and the like, and the configuration information extracting unit 920 extracts the information associated with a CA, channel selection, SORTD, and a SR configuration, and the like, from the signal.

When simultaneous transmission of SR information and ACK/NACK information in a predetermined subframe is required, the control signal generating unit 930 generates control information to be transmitted through a SR PUCCH resource (or an ACK/NACK PUCCH resource) allocated each of the two antennas, and the transceiving unit 910 transmits the control information through configured resources using the two antennas.

Although the technical idea of the present invention has been described for illustrative purposes, those skilled in the art will appreciate that various modifications, additions and substitutions are possible, without departing from the scope and spirit of the invention as disclosed in the accompanying claims. Therefore, the embodiments disclosed in the present invention are intended to illustrate the scope of the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

What is claimed is:

1. A method for a user equipment to simultaneously transmit control signals, the method comprising: generating Hybrid Automatic Repeat Request Acknowledgement/Negative-Acknowledgement (HARQ-ACK) information indicating whether downlink transmission is received; when a scheduling request (SR) and the HARQ-ACK information are determined to be simultaneously transmitted, transmitting the HARQ-ACK information through a SR PUCCH resource instead of a HARQ-ACK PUCCH resource via a first antenna; and receiving configuration information of an uplink control channel resource, wherein at least part of the HARQ-ACK information is transmitted through the uplink control channel resource configured for transmission of the scheduling request.

2. The method as claimed in claim 1, further comprising: transmitting the HARQ-ACK information through a HARQ-ACK PUCCH resource via a second antenna.

3. The method as claimed in claim 1, the HARQ-ACK information is generated by spatial bundling when the HARQ-ACK information is for a plurality of codewords.

4. A user equipment, comprising: a control signal generator to generate Hybrid Automatic Repeat Request Acknowledgement/Negative-Acknowledgement (HARQ-ACK) information indicating whether downlink transmission is received; and a transceiver to transmit the HARQ-ACK information through a scheduling request (SR) PUCCH resource instead of a HARQ-ACK PUCCH resource through a first antenna when the SR and the HARQ-ACK information are determined to be simultaneously transmitted, wherein at least part of the HARQ-ACK information is transmitted through the uplink control channel resource configured for transmission of the scheduling request, and wherein the transceiver receives configuration information of the uplink control channel resource.

5. The user equipment as claimed in claim 4, wherein the transceiver transmits the HARQ-ACK information through a HARQ-ACK PUCCH resource through a second antenna.

6. The user equipment as claimed in claim 4, the HARQ-ACK information is generated by spatial bundling when the HARQ-ACK information is for a plurality of codewords.

7. A method for a base station to receive a control signal, the method comprising: transmitting a downlink data to a user equipment; transmitting configuration information of the uplink control channel; and when a scheduling request (SR) and a Hybrid Automatic Repeat Request Acknowledgement/Negative-Acknowledgement (HARQ-ACK) information indicating whether the downlink data is received at the user equipment are determined to be simultaneously transmitted, receiving the SR and the HARQ-ACK information from the user equipment; wherein the HARQ-ACK information is received through a SR PUCCH resource instead of a HARQ-ACK PUCCH resource via a first antenna, wherein at least part of the HARQ-ACK information is transmitted through the uplink control channel resource configured for transmission of the scheduling request.

8. The method as claimed in claim 7, further comprising: receiving the HARQ-ACK information through a HARQ-ACK PUCCH resource via a second antenna.

9. The method as claimed in claim 8, the HARQ-ACK information is generated by spatial bundling when the HARQ-ACK information is for a plurality of codewords.

10. A base station, comprising: a transceiver to transmit a downlink data to a user equipment, receive a Hybrid Automatic Repeat Request Acknowledgement/Negative-Acknowledgement (HARQ-ACK) information indicating whether the downlink data is received at the user equipment when the a scheduling request (SR) and the HARQ-ACK information are determined to be simultaneously transmitted; and a control signal decoder to decode the SR and the HARQ-ACK information, wherein the transceiver receives the HARQ-ACK information through a SR PUCCH resource instead of a HARQ-ACK PUCCH resource via a first antenna, wherein at least part of the HARQ-ACK information is transmitted through the uplink control channel resource configured for transmission of the scheduling request, and wherein the transceiver transmits configuration information of the uplink control channel.

* * * * *